(12) United States Patent
Kim

(10) Patent No.: US 8,808,886 B2
(45) Date of Patent: Aug. 19, 2014

(54) BATTERY MANAGEMENT SYSTEM AND METHOD THEREOF, AND POWER STORAGE APPARATUS USING THE SAME

(75) Inventor: Meen-Suk Kim, Yongin (KR)

(73) Assignee: Samsung SDI Co., Ltd., Gyeonggi-Do (KR)

(*) Notice: Subject to any disclaimer, the term of this patent is extended or adjusted under 35 U.S.C. 154(b) by 253 days.

(21) Appl. No.: 13/098,691

(22) Filed: May 2, 2011

(65) Prior Publication Data

US 2012/0094151 A1   Apr. 19, 2012

(30) Foreign Application Priority Data

Oct. 13, 2010   (KR) .................. 10-2010-0099932

(51) Int. Cl.
*H01M 2/00*   (2006.01)
*H02J 7/00*   (2006.01)

(52) U.S. Cl.
USPC ............. 429/61; 429/17; 320/119; 338/31; 338/68

(58) Field of Classification Search
USPC ......................... 429/17, 50, 62, 61
See application file for complete search history.

(56) References Cited

U.S. PATENT DOCUMENTS

| 5,622,789 | A * | 4/1997 | Young | 429/7 |
| 6,841,971 | B1 * | 1/2005 | Spee et al. | 320/119 |
| 7,081,805 | B2 * | 7/2006 | Venzke | 338/260 |
| 7,714,539 | B2 | 5/2010 | Ishikawa | |
| 7,723,955 | B2 | 5/2010 | Zaag et al. | |
| 2009/0102422 | A1 * | 4/2009 | Naganuma et al. | 320/118 |
| 2009/0208815 | A1 * | 8/2009 | Dougherty | 429/50 |

FOREIGN PATENT DOCUMENTS

| JP | 2007-60792 A | 3/2007 |
| KR | 10-2006-0060830 A | 6/2006 |
| KR | 10-2008-0013136 A | 2/2008 |
| KR | 10-2009-0031449 A | 3/2009 |
| KR | 10-2009-0064774 A | 6/2009 |

* cited by examiner

*Primary Examiner* — Ula C Ruddock
*Assistant Examiner* — Lisa S Park Gehrke
(74) *Attorney, Agent, or Firm* — Knobbe, Martens, Olson & Bear LLP

(57) ABSTRACT

A battery management system is disclosed. The system includes a variable discharge resistor and a temperature measuring unit to measure the temperature of the discharge resistor. The resistance of the discharge resistor is modified based at least in part on the measured temperature.

15 Claims, 4 Drawing Sheets

BATTERY MANAGEMENT SYSTEM AND METHOD THEREOF, AND POWER STORAGE APPARATUS USING THE SAME

CROSS-REFERENCE TO RELATED APPLICATIONS

This application claims priority to and the benefit of Korean Patent Application No. 10-2010-0099932 filed in the Korean Intellectual Property Office on Oct. 13, 2010, the entire contents of which are incorporated herein by reference.

BACKGROUND

1. Field

The present invention relates to a battery management system, a battery management method, and a power storage apparatus using the same. More particularly, the present invention relates to a battery management system, a battery management method, and a power storage apparatus using the same for quickly performing cell balancing.

2. Description of the Related Technology

Recently, the European Union has decided upon a plan to increase the percentage of renewable energy used to 20% of all energy produced by the year 2020 and to 50% by the year 2050. The U.S.A. is also planning to carry out Renewable Portfolio Standards (RPS). Where renewable energy increases from less than 5% today to up to 30 to 40% in the future, power systems must be prepared for the change.

It is not easy to control the percentage of renewable energy produced. This is because the amount of renewable energy generated changes according to natural conditions, such as solar light, wind power, and wave power. Research is being done on a scheme that is capable of overcoming degradation in power quality and quantity in a power generation system and overcoming the mismatch between production and consumption times. Quality is evaluated on the basis of voltage and frequency. If the supply quantity of renewable energy does not coincide with the demand quantity of renewable energy in real time, abnormalities are generated in voltage and frequency, thereby potentially deteriorating the power quality of all power systems.

A power storage system that is capable of managing such shift in renewable energy is needed. This is because the power storage system can efficiently react to demand and supply by charging electricity when the amount of generation of renewable energy is high and discharging electricity when the consumption of renewable energy is high.

Power storage techniques include pumped power storage, compressed air energy storage (CAES), a flywheel technique, superconducting magnetic energy storage (SMES), rechargeable battery storage, and so on. The pumped power storage technique is a method of storing energy by pumping water up into a dam when excess electricity is available. The water is released from the dam through turbines when the amount of electricity is insufficient. The CAES technique is a method of generating electricity by compressing air in the ground or sea and then discharging the air as occasion demands. The flywheel technique is a method of generating electricity by rotating a flywheel when excess electricity is available and rotating a power generator using the flywheel when electricity is insufficient. The SMES technique is a method using a principle that current stored in a superconducting coil having resistance of 0. The rechargeable battery is a battery that can be repeatedly charged and discharged, and has been used as an uninterruptible power supply (UPS) for temporarily supplying electricity upon a power failure. The rechargeable battery has been used as an auxiliary power source of renewable energy.

The power storage system not only stores the generated power of a renewable energy source to a large capacity rechargeable battery (hereinafter referred to as a battery) of which a plurality of rechargeable batteries are connected to each other, but is also used in cooperation with a grid to store the power of the grid to the battery, or may supply the power stored in the battery to the grid or the generated power of the renewable energy source to the grid.

A battery outputting a high voltage and a large current includes a plurality of rechargeable batteries (hereinafter referred to as cells that are coupled in series. When a plurality of cells are coupled in series, cell balancing for controlling the voltage of each cell may be performed to maintain a voltage difference between the cells within a specified range. A cell in which the cell balancing is not performed deteriorates, and as a result, the life-span of the battery is shortened and the output power is decreased.

During cell balancing, the voltage and the current of the plurality of cells are respectively measured, and a cell having a high voltage or a large current is discharged to decrease the voltage difference with the other cells. The cell balancing is quickly performed so that the battery may stably output constant power.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One inventive aspect is a battery management system, which includes a discharge resistor connected to a positive potential terminal and a negative potential terminal of a cell. The system also includes a cell balancing switch selectively connecting the cell and the discharge resistor, a temperature measuring unit configured to measure the temperature of the discharge resistor, and an MCU (microcontroller unit) configured to control the resistance of the discharge resistor based at least in part on the temperature of the discharge resistor measured by the temperature measuring unit, where the temperature of the discharge resistor is maintained substantially at a reference temperature.

Another inventive aspect is a method of managing a battery. The method includes turning on a cell balancing switch connecting a cell and to a discharge resistor, measuring the temperature of the discharge resistor, and comparing the temperature of the discharge resistor and a reference temperature. The method also includes decreasing the resistance of the discharge resistor if the temperature of the discharge resistor is less than the reference temperature, and increasing the resistance of the discharge resistor if the temperature of the discharge resistor is greater than the reference temperature.

Another inventive aspect is a power storage apparatus, which includes a battery pack including a plurality of cells, and a battery management system including a plurality of cell balancing circuits and MCUs corresponding to the plurality of cells. The plurality of cell balancing circuits respectively include a discharge resistor connected to a positive potential terminal and to a negative potential terminal of the corresponding cell, and a cell balancing switch connecting the corresponding cell and the discharge resistor, and a temperature measuring unit configured to measure the temperature of the discharge resistor. The MCU controls the resistance of the discharge resistor based at least in part of the temperature of the discharge resistor measured by the temperature measuring unit, and the temperature of the discharge resistor is maintained substantially at a reference temperature.

DETAILED DESCRIPTION OF CERTAIN INVENTIVE EMBODIMENTS

Figure 1:
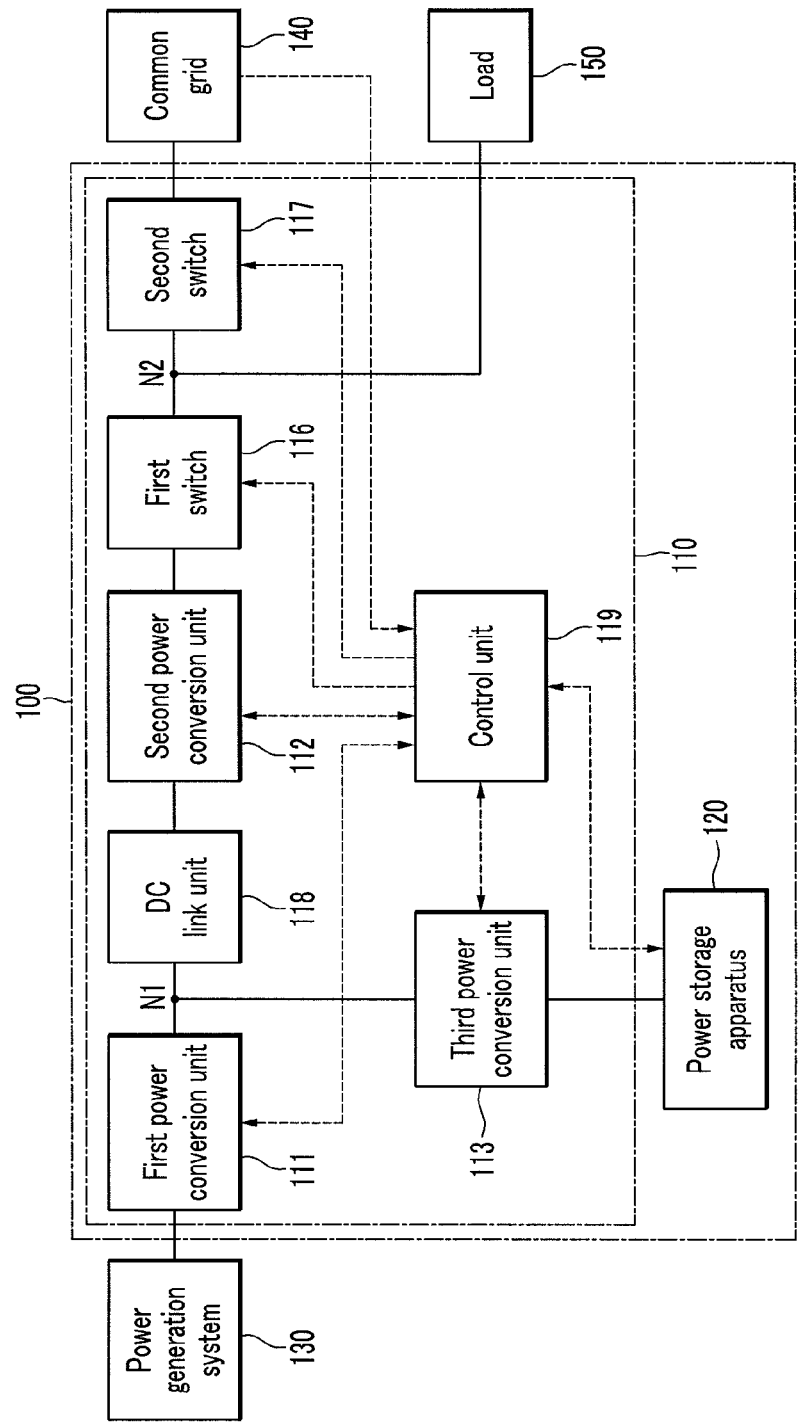
FIG. 1 is a block diagram of a power system according to an exemplary embodiment.

Hereinafter, some exemplary embodiments are described in detail with reference to the accompanying drawings. As those skilled in the art would realize, the described embodiments may be modified in various ways, without departing from the spirit or scope of the present invention.

Furthermore, in the exemplary embodiments, constituent elements having the same or similar construction or function are generally assigned the same reference numerals and are described in connection with one embodiment as a representative example. In the remaining exemplary embodiments, generally only constituent elements different from those of the first exemplary embodiment are described.

In order to clarify the description of the inventive aspects, some parts not related to the description are omitted, and the same reference numbers are generally used throughout the drawings to refer to the same or similar parts.

When it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 is a block diagram of a grid-tied power storage system according to an exemplary embodiment.

Referring to FIG. 1, a grid-tied power storage system 100 includes a power management system 110 and a power storage apparatus 120.

The grid-tied power storage system 100 is connected to a power generation system 130, a common grid 140, and a load 150.

The power generation system 130 includes a system for producing electrical energy by using renewable energy, such as, but not limited to, solar light, wind power, wave power, tidal power, and geothermal power. For example, a solar power generation system includes a solar cell module in which a plurality of solar cells for converting solar lighting into electrical energy are coupled in series or in parallel.

The common grid 140 includes a power station for producing electric power by using, for example, combustible fuel generation, water power generation, or atomic power generation, and a substation or a power transmission site for changing the properties of a voltage or current in order to transmit the produced power through a transmission line or a distribution line.

The load 150 refers to various electric devices that consume power. For example, the load can include consumer electronics and production facilities at factories.

The power management system 110 is a system for use with power of the power generation system 130, power of the common grid 140, and power of the power storage apparatus 120. The power management system 110 can manage a temporal mismatch between production and consumption of a power grid by using the power storage apparatus 120.

The power storage apparatus 120 includes a rechargeable battery that can be repeatedly charged and discharged. The rechargeable battery includes, for example, a nickel-cadmium battery, a lead-acid battery, a nickel-hydrogen battery, a lithium-ion battery, a lithium polymer battery, and so on. The power storage apparatus 120 may be a high-capacity storage device in which multiple rechargeable batteries are connected in parallel or in series.

Meanwhile, a battery management system (hereinafter referred to as a "BMS") for controlling the charge and discharge of a battery may be included in the power storage apparatus 120 or the power management system 110. The BMS functions to protect the rechargeable battery from, for example, overcharge, over-discharge, overcurrent, or overheating by detecting, for example, a voltage, a current, or a temperature of the cell and monitoring a state of charge (hereinafter referred to as an "SOC") and state of health (hereinafter referred to as an "SOH") of the cell to improve the efficiency of the battery through cell balancing.

The BMS connects the object cell of the cell balancing to a discharge resistor in a cell balancing process for discharging. Here, the BMS controls the resistance of the discharge resistor in a range in which the temperature of the discharge resistor is not over a predetermined reference temperature to quickly perform the discharge of the object cell of the cell balancing.

The power management system 110 includes a first power conversion unit 111, a second power conversion unit 112, a third power conversion unit 113, a first switch 116, a second switch 117, a DC link unit 118, and a control unit 119.

The first power conversion unit 111 is connected to the power generation system 130 and configured to convert a first power generated by the power generation system 130 into a second power, and transfer the second power to a first node N1. The first power generated by the power generation system 130 may be DC power or AC power. The second power of the first node N1 is DC power. That is, the first power conversion unit 111 may be a converter for converting the first power of DC into the second power having another magnitude or an inverter for converting the first power of AC into the second power of DC. The first power conversion unit 111 may perform maximum power point tracking (hereinafter referred to as "MPPT") control for maximizing power generated by the power generation system 130. That is, the first power conversion unit 111 may be an MPPT converter having a maximum power point tracking function.

The DC link unit 118 is connected to the first node N1, and is configured to maintain a voltage level of the first node N1 at a DC link voltage level. The DC link unit 118 prevents a voltage level of the first node N1 from becoming unstable because of a shift in the output voltage of the power generation system 130, a substantially instantaneous voltage drop of the common grid 140, a sudden increase in the load 150, or an increase in the load 150 beyond the specified maximum load. Consequently, the second power conversion unit 112 and the third power conversion unit 113 can be normally operated. The DC link unit 118 may be a capacitor connected in parallel between the first node N1 and the second power conversion unit 112. An aluminum electrolytic capacitor, a polymer capacitor, or a multi-layer ceramic capacitor may be used as the capacitor for the DC link.

The second power conversion unit 112 is connected between the first node N1 and the second node N2. The common grid 140 and the load 150 are connected to the second node N2. The second power conversion unit 112 converts the DC power of the first node N1 into AC power and transfers the AC power to the second node N2. Furthermore, the second power conversion unit 112 converts AC power of the second node N2 into DC power and transfers the DC power to the first node N1. That is, the second power conversion unit 112 is a bi-directional converter for converting the DC power of the first node N1 for the second node N2, and for converting the AC power of the second node N2 for the first node N1. AC power to be supplied to the common grid 140 and the load 150 or AC power supplied from the common grid 140 is formed in the second node N2.

The third power conversion unit 113 is connected between the first node N1 and the power storage apparatus 120. The third power conversion unit 113 converts the second DC power supplied from the first node N1 into a third DC power to be stored in the power storage apparatus 120, and transfers the third DC power to the power storage apparatus 120. Furthermore, the third power conversion unit 113 converts the third DC power supplied from the power storage apparatus 120 into the second DC power, and transfers the second DC power to the first node N1. That is, the third power conversion unit 113 is a bi-directional converter for converting the DC power of the first node N1 for the power storage apparatus 120 and for converting the DC power of the power storage apparatus 120 for the first node N1.

The first switch 116 is connected between the second power conversion unit 112 and the second node N2, and is configured to selectively cut off the flow of power between the second power conversion unit 112 and the second node N2. The second switch 117 is connected between the second node N2 and the common grid 140, and is configured to selectively cut off the flow of power between the second node N2 and the common grid 140. A field effect transistor (FET), a bipolar junction transistor (BJT), or the like may be used as the first switch 116 and the second switch 117.

For example, if the common grid 140 is not functioning properly, the second switch 117 cuts off the supply of power to or from the common grid 140. The grid-tied power storage system 100 then operates independent of the common grid 140. When the second switch 117 is opened, the grid-tied power storage system 100 is electrically isolated from the common grid 140 and thus is independently operated by power of the power generation system 130 and the power storage apparatus 120. Accordingly, the improperly functioning common grid 140 can be prevented from affecting the grid-tied power storage system 100, and the grid-tied power storage system 100 can properly supply power to the load 150.

The control unit 119 controls the general operation of the power management system 110. The control unit 119 receives information (e.g., sensing signals related to voltage, current, and temperature) of the power generation system 130, from, for example, the first power conversion unit 111, power storage information, including an SOC, an SOH, etc., from the power storage apparatus 120 (or a BMS), and grid information, including voltage, current, temperature, etc. of a grid, from the common grid 140. The control unit 119 controls an operating mode of the power management system 110 on the basis of the information about power generated by the power generation system 130, the power storage information of the power storage apparatus 120, and the grid information of the common grid 140. Furthermore, the control unit 119 receives sensing signals related to voltage, current, and temperature from the first power conversion unit 111, the second power conversion unit 112, and the third power conversion unit 113, and controls the power conversion efficiency of each of the power conversion units 111, 112, and 113 according to an operating mode of the power management system 110. The control unit 119 controls the on and off state of the first switch 116 and the second switch 117 according to an operating mode of the power management system 110.

The operating modes of the power management system 110 can be classified according to a power supply direction between two or more of the power storage apparatus 120, the power generation system 130, the common grid 140, and the load 150. The operating mode of the power management system 110 includes (1) the supply of power from the power generation system 130 to the power storage apparatus 120, (2) the supply of power from the power generation system 130 to the common grid 140, (3) the supply of power from the power generation system 130 to the load 150, (4) the supply of power from the power storage apparatus 120 to the common grid 140, (5) the supply of power from the power storage apparatus 120 to the load 150, (6) the supply of power from the common grid 140 to the power storage apparatus 120, and (7) the supply of power from the common grid 140 to the load 150.

In mode (1), power is supplied from the power generation system 130 to the power storage apparatus 120. In this mode, the control unit 119 transmits an off signal to the first switch 116, thereby cutting off the flow of the power from the first node N1 to the second node N2. The first power generated by the power generation system 130 is converted into the second DC power by the first power conversion unit 111. Voltage of the second DC power is stabilized at a DC link voltage level by the DC link unit 118. The second DC power stabilized at the DC link voltage level is converted into the third DC power by the third power conversion unit 113 and is supplied to the power storage apparatus 120, thereby charging the battery.

In mode (2), power is supplied from the power generation system 130 to the common grid 140. In this mode, the control unit 119 transmits an off signal to the third power conversion unit 113, thereby cutting off the flow of the power from the first node N1 to the power storage apparatus 120. The control unit 119 transmits an on signal to the first switch 116 and the second switch 117. The first power generated by the power generation system 130 is converted into the second DC power by the first power conversion unit 111. Voltage of the second power is stabilized at a DC link voltage level by the DC link unit 118. The second power stabilized at the DC link voltage level is converted into AC power by the second power conversion unit 112 and is supplied to the common grid 140. Here, the second power conversion unit 112 outputs the AC power which conforms to power quality criteria, such as the total harmonic distortion (THD), power factor, etc. of voltage and current for the common grid 140.

In mode (3), power is supplied from the power generation system 130 to the load 150. In this mode, the control unit 119 transmits an off signal to the third power conversion unit 113 and the second switch 117, thereby cutting off the flow of the power from the first node N1 to the power storage apparatus 120 and the common grid 140. The control unit 119 transmits an on signal to the first switch 116. The first power generated by the power generation system 130 is converted into the second DC power by the first power conversion unit 111. Voltage of the second power is stabilized at a DC link voltage level by the DC link unit 118. The second power stabilized at the DC link voltage level of the first node N1 is converted into AC power by the second power conversion unit 112 and is supplied to the load 150. The load 150 may use AC power of the common grid 140. The second power conversion unit 112 outputs AC power that is used in the load 150 and conforms to power quality criteria for the common grid 140.

In mode (4), power is supplied from the power storage apparatus 120 to the common grid 140. In this mode, the control unit 119 transmits an on signal to the first switch 116 and the second switch 117. DC power of an output voltage level, output by the power storage apparatus 120, is converted into DC power of a DC link voltage level by the third power conversion unit 113 and is stabilized by the DC link unit 118. The power stabilized at the DC link voltage level of the first node N1 is converted into AC power by the second power conversion unit 112 and is supplied to the common grid 140.

In mode (5), power is supplied from the power storage apparatus 120 to the load 150. In this mode, the control unit 119 transmits an on signal to the first switch 116 and transmits an off signal to the second switch 117. DC power of an output voltage level, output by the power storage apparatus 120, is converted into DC power of a DC link voltage level by the third power conversion unit 113 and is stabilized by the DC link unit 118. The power stabilized at the DC link voltage level of the first node N1 is converted into AC power by the second power conversion unit 112 and is supplied to the load 150.

In mode (6), power is supplied from the common grid 140 to the power storage apparatus 120. In this mode, the control unit 119 transmits an on signal to the first switch 116 and the second switch 117. AC power of the common grid 140 is converted into DC power of a DC link voltage level by the second power conversion unit 112. The DC power of a DC link voltage level of the first node N1 is converted into DC power of a voltage level for storing power by the third power conversion unit 113 and is supplied to the power storage apparatus 120.

In mode (7), power is supplied from the common grid 140 to the load 150. In this mode, the control unit 119 transmits an off signal to the first switch 116 and an on signal to the second switch 117. AC power of the common grid 140 is supplied to the load 150.

The operating modes of the power management system 110 have been discussed as being classified according to a power supply direction among the power storage system 120, the power generation system 130, the common grid 140, and the load 150, but the power supply modes may be performed in combination. Accordingly, the operating mode of the power management system 110 may be configured in various ways. For example, power may be supplied from the power generation system 130 to the power storage apparatus 120 and the load 150, or power may be supplied from the power generation system 130 and the power storage apparatus 120 to the load 150. In some embodiments, power may be supplied from the power generation system 130 and the power storage apparatus 120 to the common grid 140 and the load 150.

Figure 2:
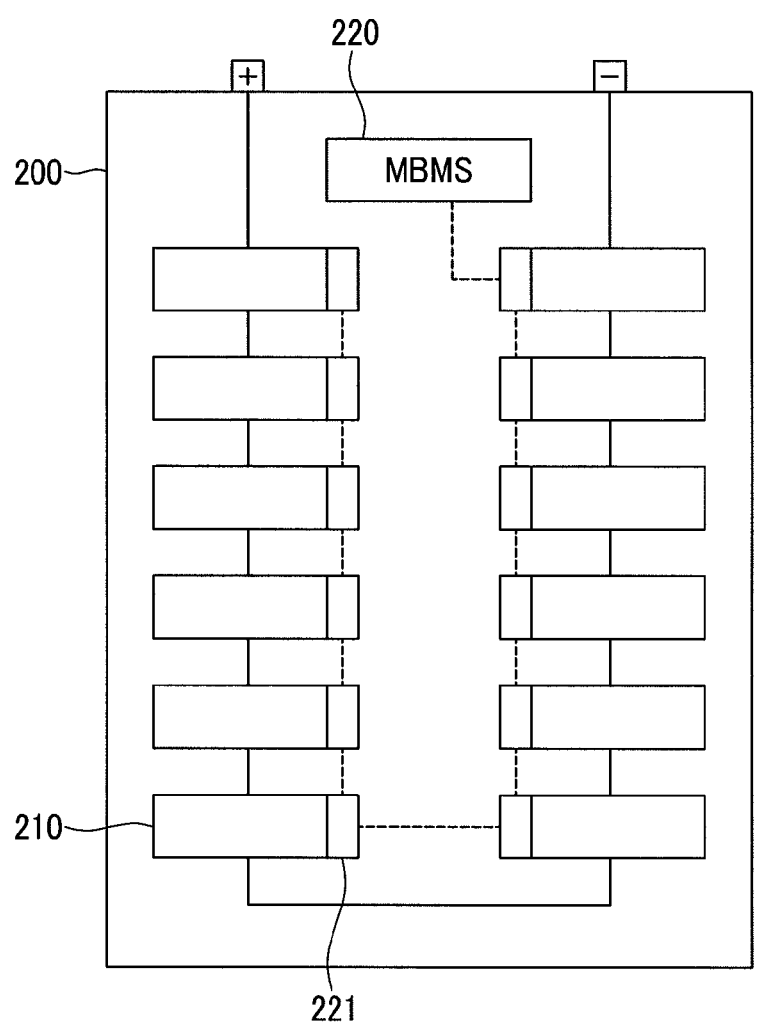
FIG. 2 is a block diagram of a power storage apparatus according to an exemplary embodiment.

FIG. 2 is a block diagram of a power storage apparatus according to an exemplary embodiment.

Referring to FIG. 2, the power storage apparatus includes at least one battery pack 210 and a pack BMS 221 managing the charge and discharge of the battery pack 210. A plurality of battery packs 210 may be provided, and the plurality of battery packs 210 may be arranged in a battery rack 200.

In this embodiment, the plurality of battery packs 210 are coupled in series and may be connected to a positive potential output terminal (+) and a negative potential output terminal (−) of the battery rack 200. A power line is respectively connected to the positive potential output terminal (+) and the negative potential output terminal (−). The plurality of battery packs 210 that are coupled in series may output power of a high voltage and large current to the power line through the positive potential output terminal (+) and the negative potential output terminal (−). The battery pack 210 includes a plurality of cells that are coupled in parallel or in series.

The plurality of battery packs 210 respectively include the pack BMS 221 to manage the charge and discharge of the battery pack 210, and a plurality of pack BMS 221 are connected to a master BMS 220 (hereinafter, MBMS) to manage the charge and discharge of the entire battery rack 200.

The pack BMS 221 measures the voltage, the current, and the temperature of each cell included in the battery pack 210 to estimate SOC and SOH of each cell. The pack BMS 221 may be used in the cell balancing based on the estimated SOC of the cell. Here, the pack BMS 221 connects the cell balancing object cell to the discharge resistor for discharging during the cell balancing process, and controls the resistance of the discharge resistor in a range in which the temperature of the discharge resistor is not over a predetermined reference temperature such that the discharge of the cell balancing object cell may be quickly preformed.

Figure 3:
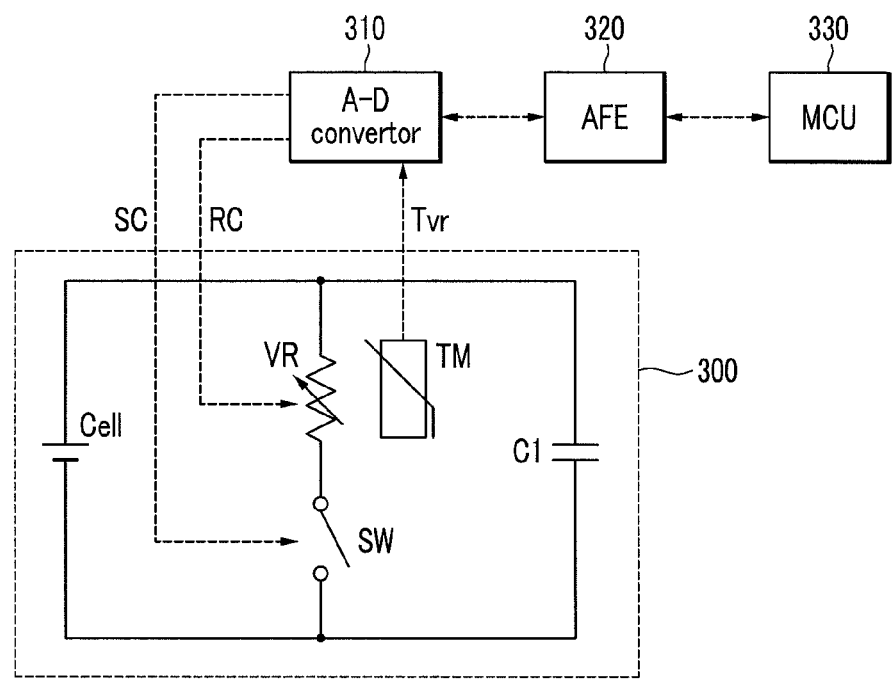
FIG. 3 is a battery management system according to an exemplary embodiment.

A battery management system controlling the resistance of the discharge resistor of the cell balancing object cell within the range in which the temperature of the discharge resistor is not over a predetermined reference temperature will be described. FIG. 3 is a battery management system according to an exemplary embodiment.

Referring to FIG. 3, a battery management system includes a cell balancing circuit 300, an A-D converter 310, an AFE (analog front end) 320, and an MCU (microcontroller units) 330 for each of a plurality of cells. For better understanding and ease of description, one of the plurality of cell balancing circuits is described.

The cell balancing circuit 300 includes a discharge resistor VR connected to the positive potential terminal and selectively connected to the negative potential terminal of the cell Cell for the cell balancing, a cell balancing switch SW selectively connecting the cell Cell and the discharge resistor VR, a temperature measuring unit TM measuring the temperature of the discharge resistor VR, and a capacitor C1 storing the voltage of the cell Cell.

The discharge resistor VR is a variable resistor having a resistance that is varied according to the resistance control signal RC transmitted from the MCU 330. If the resistance of the discharge resistor VR is decreased, the current amount that is discharged in the cell Cell is increased, and the heating amount in the discharge resistor VR is increased according to the current amount. If the resistance of the discharge resistor VR is increased, the current amount that is discharged in the cell Cell is decreased, and the heating amount in the discharge resistor VR is decreased according to the current amount. The discharge resistor VR consumes the energy of the cell as heat during the cell balancing process when discharging the cell Cell.

The cell balancing switch SW is turned on/off according to the switch control signal SC transmitted from the MCU 330. If the cell balancing switch SW is turned on, the cell Cell and the discharge resistor VR are connected such that the discharge of the cell Cell is performed, and if the cell balancing switch SW is turned off, the cell Cell and the discharge resistor VR are disconnected such that the discharge of the cell Cell is stopped.

The temperature measuring unit TM may be installed to contact or being close to the discharge resistor VR to measure the temperature Tvr of the discharge resistor. The temperature measuring unit TM measures the discharge resistor temperature Tvr and transmits it to the MCU 330. The temperature measuring unit TM may be formed of a thermistor as a semiconductor circuit element of which the electrical resistance is changed according to the temperature.

The capacitor C1 is connected to the positive potential terminal and the negative potential terminal of the cell Cell such that the voltage of the cell Cell is stored in the capacitor C1. The MCU 330 measures the voltage of the cell Cell stored in the capacitor C1 to select the cell where the cell balancing is needed among the plurality of cells included in the battery pack. The voltage of the cell Cell may be measured by using, for example, a current device.

The A-D converter 310 converts the discharge resistor temperature Tvr transmitted from the temperature measuring unit TM as an analog signal into a digital signal. The A-D converter 310 transmits the discharge resistor temperature Tvr as the digital signal to the AFE 320. The A-D converter 310 transmits the switch control signal SC from the MCU 330 to the cell balancing switch SW and the resistance control signal RC to the discharge resistor VR.

The AFE 320 adds an amplification value to the digital signal output from the A-D converter 310 to amplify the digital signal. That is, the AFE 320 amplifies the digital signal of the discharge resistor temperature Tvr from the A-D converter 310 and transmits it to the MCU 330. The AFE 320 transmits the switch control signal SC and the resistance control signal RC from the MCU 330 to the A-D converter 310.

The MCU 330 measures the voltage of the cell Cell stored in the capacitor C1 to determine the performance of the cell balancing, and transmits the switch control signal SC to the cell balancing switch SW to control the on and off of the cell balancing switch SW.

The MCU 330 controls the resistance of the discharge resistor such that the discharge resistor temperature Tvr transmitted from the temperature measuring unit TM is maintained close to a predetermined reference temperature. That is, if the discharge resistor temperature Tvr is less than the reference temperature, the MCU 330 transmits the resistance control signal RC to the discharge resistor VR such that the resistance of the discharge resistor VR is decreased. The current amount flowing from the cell Cell is increased according to the decreasing of the resistance of the discharge resistor VR. Also, if the discharge resistor temperature Tvr is greater than the reference temperature, the MCU 330 transmits the resistance control signal RC to the discharge resistor VR to increase the resistance of the discharge resistor VR. The current amount flowing from the cell Cell is decreased according to the increasing of the resistance of the discharge resistor VR. The reference temperature may be determined as a stress condition temperature (e.g., 70° C.) of the discharge resistor VR or a predetermined temperature (e.g., 60° C.) that is less than the stress condition temperature of the discharge resistor VR.

For example, if the reference temperature for the discharge resistor temperature Tvr is determined as 60° C. and the measured discharge resistor temperature Tvr is 40° C., the MCU 330 may decrease the resistance of the discharge resistor VR to increase the current amount flowing from the cell Cell. The MCU 330 consecutively monitors the discharge resistor temperature Tvr measured in the temperature measuring unit TM to increase the resistance of the discharge resistor VR at the time that the discharge resistor temperature Tvr is over the reference temperature of 60° C. such that the current amount flowing from the cell Cell may be decreased.

Figure 4:
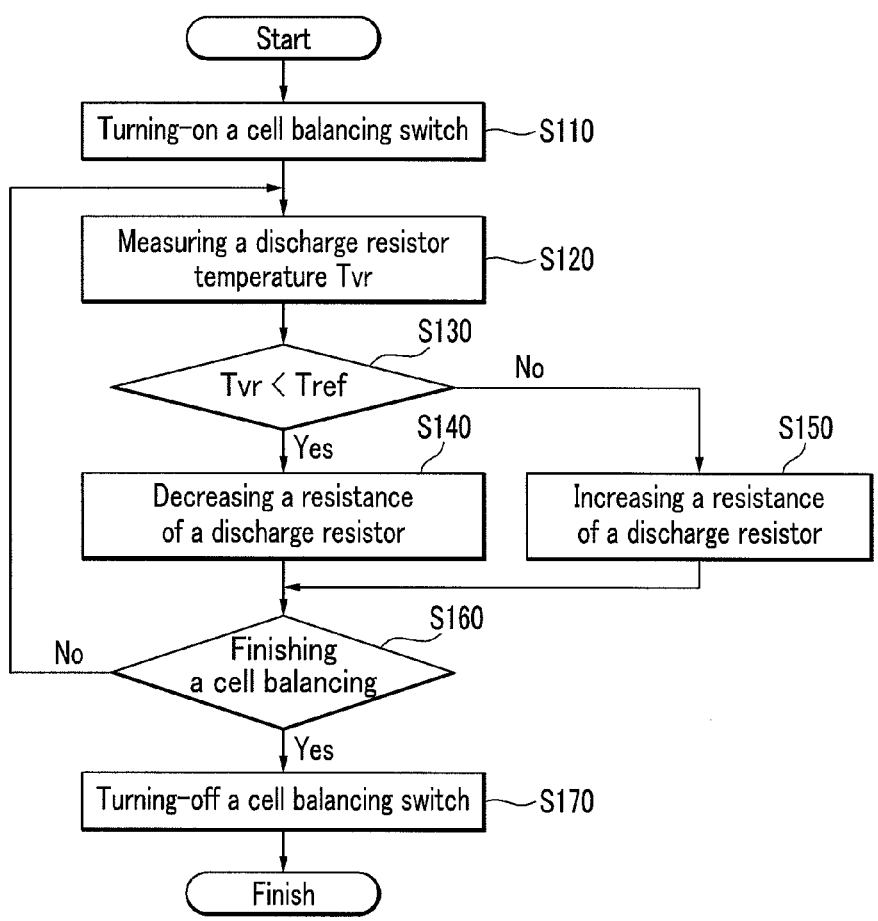
FIG. 4 is a flowchart showing a battery management method according to an exemplary embodiment.

FIG. 4 is a flowchart showing a battery management method according to an exemplary embodiment.

Referring to FIG. 4, the MCU 330 measures the voltage of a plurality of cells, and determines if cell balancing is to be performed. For a cell on which cell balancing is to be performed, the MCU 330 transmits a first switch control signal SC to turn on the cell balancing switch SW of the cell that the cell balancing is needed (S110). The MCU 330 performs the cell balancing if the voltage difference between the plurality of cells is over a predetermined range (e.g., 30 mV). The MCU 330 selects a cell having a relatively high voltage among the plurality of cells as the cell that the cell balancing is needed. If the cell balancing switch SW is turned on, the cell is connected to the discharge resistor VR and the voltage of the cell is reduced by the discharge resistor VR such that the cell discharge is performed. The discharge resistor temperature Tvr increases according to the current amount flowing from the cell.

The temperature measuring unit TM measures the discharge resistor temperature Tvr (S120). The temperature measuring unit TM transmits the measured discharge resistor temperature Tvr to the MCU 330.

The MCU 330 compares the discharge resistor temperature Tvr with the reference temperature Tref (S130). If the discharge resistor temperature Tvr is less than the reference temperature Tref, the MCU 330 transmits the first resistance control signal RC to decrease the resistance of the discharge resistor VR to the discharge resistor VR such that the resistance of the discharge resistor VR is decreased (S140). If the resistance of the discharge resistor VR is decreased, the current amount flowing from the cell to the discharge resistor VR is increased such that the cell discharge is quickly performed. If the discharge resistor temperature Tvr is greater than the reference temperature Tref, the MCU 330 transmits the second resistance control signal RC to increase the resistance of the discharge resistor VR to the discharge resistor VR such that the resistance of the discharge resistor VR is increased (S150). If the resistance of the discharge resistor VR is increased, the current amount flowing from the cell to the discharge resistor VR is decreased such that the discharge resistor temperature Tvr is decreased.

The MCU 330 measures the voltage of the cell being balanced to determine whether the cell voltage has been lowered sufficiently (160). If the voltage difference between the cell being balanced and the other cells is less than a threshold, the MCU 330 transmits the second switch control signal SC to turn off the cell balancing switch SW of the cell being balanced (S170). For example, the finish condition of the cell balancing may be determined that the voltage difference between the cell being balanced and the other cells is less than 10 mV.

If the voltage difference between of the cell being balanced and the other cells does not correspond to the finish condition of the cell balancing, the MCU 330 continuously performs the measuring of the discharge resistor temperature Tvr and the resistance control of the discharge resistor VR.

As described above, the discharge resistor VR is a variable resistor, and the resistance of the discharge resistor VR is decreased so that the discharge resistor temperature Tvr is maintained close to a reference temperature such that the discharge of the cell where the cell balancing is needed may be quickly and reliably performed. That is, the cell balancing of the battery may be quickly performed, and the output of the battery may be stably maintained.

The drawings and the detailed description above are examples and are provided to explain various aspects. Therefore, it will be appreciated to those skilled in the art that various modifications may be made and other equivalent embodiments are available.

What is claimed is:

1. A battery management system, comprising:
a discharge resistor connected to a positive potential terminal and a negative potential terminal of a cell, the discharge resistor receiving a resistance control signal;
a cell balancing switch selectively connecting the cell and the discharge resistor, the cell balancing switch receiving a switch control signal;
a temperature measuring unit that measures the temperature of the discharge resistor, the temperature measuring unit located adjacent to the discharge resistor; and
an MCU (microcontroller unit) connected to the discharge resistor and providing the resistance control signal and connected to the cell balancing switch and providing the switch control signal, the MCU programmed to control the resistance of the discharge resistor based at least in part on the temperature of the discharge resistor measured by the temperature measuring unit, wherein the temperature of the discharge resistor is maintained substantially at a reference temperature.

2. The battery management system of claim 1, wherein the MCU is programmed to decrease the resistance of the discharge resistor if the temperature of the discharge resistor is less than the reference temperature.

3. The battery management system of claim 1, wherein the MCU is programmed to increase the resistance of the discharge resistor if the temperature of the discharge resistor is greater than the reference temperature.

4. The battery management system of claim 1, wherein the discharge resistor is a variable resistor having one terminal directly connected to the positive potential terminal of the cell and the other terminal selectively connected to the negative potential terminal of the cell.

5. The battery management system of claim 1, wherein the MCU controls the on/off of the cell balancing switch.

6. The battery management system of claim 1, further comprising a converter converting the temperature of the discharge resistor into a digital signal and transmitting it to the MCU.

7. The battery management system of claim 1, wherein the temperature measuring unit is a thermistor.

8. The battery management system of claim 1, further comprising a capacitor connected to the positive potential terminal and to the negative potential terminal of the cell.

9. A power storage apparatus comprising:
a battery pack including a plurality of cells; and
a battery management system including a plurality of cell balancing circuits and MCUs corresponding to the plurality of cells, wherein the plurality of cell balancing circuits respectively include:
a discharge resistor connected to a positive potential terminal and to a negative potential terminal of the corresponding cell, the discharge resistor receiving a resistance control signal;
a cell balancing switch connecting the corresponding cell and the discharge resistor, the cell balancing switch receiving a switch control signal; and
a temperature measuring unit that measures the temperature of the discharge resistor, the temperature measuring unit located adjacent to the discharge resistor,
the MCU connected to the discharge resistor and providing the resistance control signal and connected to the cell balancing switch and providing the switch control signal, the MCU programmed to control the resistance of the discharge resistor based at least in part of the temperature of the discharge resistor measured by the temperature measuring unit, wherein the temperature of the discharge resistor is maintained substantially at a reference temperature.

10. The power storage apparatus of claim 9, wherein the MCU is programmed to decrease the resistance of the discharge resistor if the temperature of the discharge resistor is less than the reference temperature.

11. The power storage apparatus of claim 9, wherein the MCU is programmed to increase the resistance of the discharge resistor if the temperature of the discharge resistor is greater than the reference temperature.

12. The power storage apparatus of claim 9, wherein the MCU controls the on/off state of the cell balancing switch.

13. The power storage apparatus of claim 9, wherein the discharge resistor is a variable resistor having one terminal directly connected to the positive potential terminal of the corresponding cell and the other terminal selectively connected to the negative potential terminal of the corresponding cell.

14. The power storage apparatus of claim 9, wherein the temperature measuring unit is a thermistor.

15. The power storage apparatus of claim 9, wherein the plurality of cell balancing circuits respectively include a capacitor connected to the positive potential terminal and the negative potential terminal of the corresponding cell.

* * * * *